US007182113B2

(12) United States Patent
Saguchi

(10) Patent No.: US 7,182,113 B2
(45) Date of Patent: Feb. 27, 2007

(54) PNEUMATIC TIRE WITH TREAD INCLUDING PROTRUDING PORTIONS ON WALL SURFACE OF GROOVE

(75) Inventor: Takanari Saguchi, Musashino (JP)

(73) Assignee: Bridgestone Corporation, Tokyo (JP)

( * ) Notice: Subject to any disclaimer, the term of this patent is extended or adjusted under 35 U.S.C. 154(b) by 62 days.

(21) Appl. No.: 10/501,560

(22) PCT Filed: Jan. 16, 2003

(86) PCT No.: PCT/JP03/00301

§ 371 (c)(1),
(2), (4) Date: Jul. 16, 2004

(87) PCT Pub. No.: WO03/061993

PCT Pub. Date: Jul. 31, 2003

(65) Prior Publication Data

US 2005/0076986 A1  Apr. 14, 2005

(30) Foreign Application Priority Data

Jan. 18, 2002 (JP) .............................. 2002-010747

(51) Int. Cl.
*B60C 11/11* (2006.01)
*B60C 11/13* (2006.01)
(52) U.S. Cl. ............................. 152/209.2; 152/209.21; 152/902
(58) Field of Classification Search ............. 152/209.2, 152/209.21, 902
See application file for complete search history.

(56) References Cited

U.S. PATENT DOCUMENTS 5,209,793 A * 5/1993 Cusimano, II ........... 152/209.2
5,964,267 A * 10/1999 Poque et al. ........... 152/209.21
6,105,643 A * 8/2000 Rohweder et al. ...... 152/209.21

FOREIGN PATENT DOCUMENTS

| CA | 2083627    | * | 9/1999  |
| DE | 4138687    | * | 5/1993  |
| EP | 544236     | * | 6/1993  |
| EP | 1075971    | * | 2/2001  |
| JP | 5-238210   | * | 9/1993  |
| JP | 2000-247111| * | 9/2000  |
| JP | 2001-219712| * | 8/2001  |
| JP | 2001-322407| * | 11/2001 |
| WO | WO 00/51831| * | 9/2000  |

\* cited by examiner

*Primary Examiner*—Steven D. Maki
(74) *Attorney, Agent, or Firm*—Sughrue Mion, PLLC

(57) ABSTRACT

A pneumatic tire 10, in which at least one rib groove 12 extended in a tire circumferential direction is formed on a tread surface portion T of a tread portion 11, and portions 13 discontinuous in terms of rigidity are formed in a circumferential direction of rib lines B formed by the rib groove 12, the discontinuous portions 13 causing variations of tire axle force. Rigidity changing portions 20 which cancel the variations of the tire axle force are provided in the rib groove 12, the variations being caused by the discontinuous portions 13. Thus, vibrational force to an axle is lowered, and pattern noise caused thereby is reduced effectively.

11 Claims, 11 Drawing Sheets

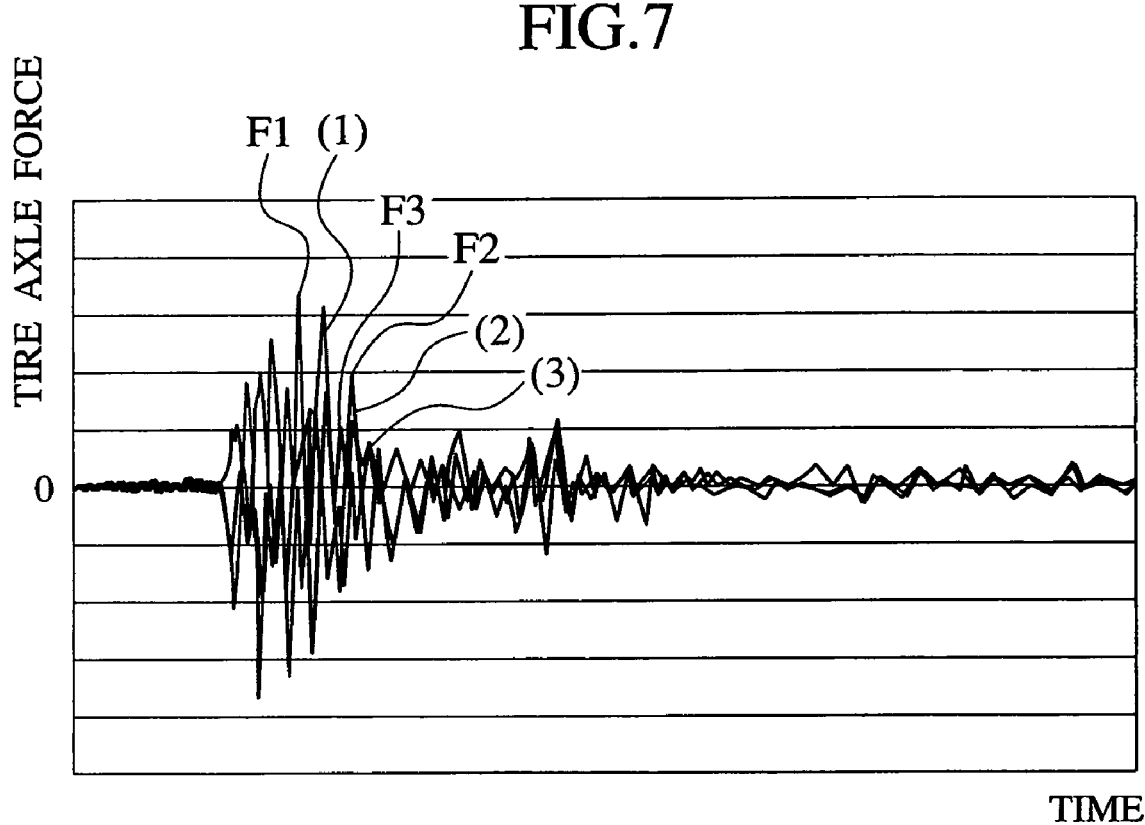

PNEUMATIC TIRE WITH TREAD INCLUDING PROTRUDING PORTIONS ON WALL SURFACE OF GROOVE

TECHNICAL FIELD

The present invention relates to a pneumatic tire in which portions discontinuous in terms of rigidity are formed in a circumferential direction of rib lines formed by a rib groove, the discontinuous portions causing variations of tire axle force. Particularly, the present invention relates to a pneumatic tire made to reduce noise in a vehicle cabin, which is caused by the discontinuous portions.

BACKGROUND ART

In a pneumatic tire such as a radial tire mounted on a vehicle such as an automobile, a tread portion is formed in order to enhance a grip performance on a road surface. This tread portion is constituted in a manner that a plurality of rib grooves extended in a tire circumferential direction (grooves in the circumferential direction) are formed on a tread surface portion in contact with the road surface to form a plurality of rib lines, that a large number of lug grooves extended in a tire width direction (lateral grooves) are further formed on these rib lines at an appropriate interval, and that blocks (land portions) are formed by these rib grooves and lug grooves.

Incidentally, in order to reduce pattern noise caused by such a pattern of the tread portion, techniques such as changing a geometric relationship between the grooves and a shape of footprints are frequently used from a viewpoint that an impact causes the noise. The impact is caused in a manner that the pattern of the tread portion, and particularly, the blocks surrounded by the rib grooves and the lug grooves are brought into contact with the road surface.

However, among problematic phenomena in the noise caused by such a pattern of the tire, there is noise heard in a vehicle cabin during vehicle running (hereinafter, referred to as "pattern noise").

This pattern noise as a phenomenon contains a component directly radiated from the tire. However, because a frequency of the noise is equal to or lower than 1000 Hz, it is conceived that the noise is also pretty much affected by an indirect sound generated in a manner that the tire vibrates an axle to vibrate a vehicle body.

It can be grasped that the indirect sound in this case is caused by variations of tire axle force, which result from the lug grooves becoming portions discontinuous in terms of rigidity in the tire circumferential direction. Specifically, at a moment when the lug grooves contact the road surface, spaces in the lug grooves become portions where the rigidity is lowered. Then, a load is lowered to a great extent, leading to great variations of the tire axle force.

In this connection, the present invention is one created in consideration of such a conventional problem. It is an object of the present invention to provide a pneumatic tire, in which, for variations of tire axle force, which are caused by portions discontinuous in terms of rigidity, such as lug grooves, reverse axle force is generated, and thus pattern noise resulting from the portions discontinuous in terms of the rigidity on a tread portion is reduced.

DISCLOSURE OF THE INVENTION

In order to achieve the foregoing object, an invention of a first aspect is a pneumatic tire, in which at least one rib groove extended in a tire circumferential direction is formed on a tread surface portion of a tread portion, and portions discontinuous in terms of rigidity are formed in a circumferential direction of rib lines formed by the rib groove, the discontinuous portions causing variations of tire axle force, characterized in that rigidity changing portions which cancel the variations of the tire axle force, caused by the discontinuous portions, are provided in the rib groove.

In this case, when the discontinuous portions formed in the rib lines reach a footprint line as the tire rotates, though the tire axle force is varied by these discontinuous portions, the variations of the tire axle force can be canceled by the rigidity changing portions provided in the rib groove. Therefore, the variations of the tire axle force, which are caused by the discontinuous portions, are restricted by the rigidity changing portions, and eventually, vibrational force to an axle is lowered, and pattern noise caused thereby can be reduced effectively.

Moreover, the rigidity changing portions, which cancel the variations of the tire axle force caused by the discontinuous portions, are provided in the rib groove, and thus these rigidity changing portions do not jut from a surface of the tire. Accordingly, even in the case where the rigidity changing portions are located within a region of the tread surface portion, the surface of the tire can be grounded smoothly.

Here, the footprint line refers to a footprint edge between the tire and a road surface, and can be measured in a state where the tire is mounted on a vehicle. However, it is also possible to perform the measurement for the tire separate from the vehicle in a state to be described later. In this case, a load refers to the maximum load (the maximum load resistance) on a single tire in an application size described in the following standard, an internal pressure refers to an air pressure corresponding to the maximum load (the maximum load resistance) on the single tire in the application size described in the following standard, and a rim refers to a standard rim (or an approved rim or a recommended rim) in the application size described in the following standard.

Moreover, the standard is determined in accordance with an industrial standard effective in a region where the tire is produced or used. For example, the standard is prescribed by the Year Book of The Tire and Rim Association, Inc. in the United States, by the Standard Manual of The European Tire and Rim Technical Organization in Europe, and by the JATMA Year Book of The Japan Automobile Tire Manufacturers Association, Inc.

An invention of a second aspect is the pneumatic tire according to the first aspect, characterized in that protruding portions which are formed on a wall surface of the rib groove and increase rigidity against tread compression are used as the rigidity changing portions.

In this case, the protruding portions are formed on the wall surface of the rib groove, and thus, in portions where the protruding portions are formed, the rib lines are amplified in a tire width direction, and rigidity can be easily increased. When the portions where the rigidity is increased are grounded, the rigidity against the tread compression is increased. In this case, the rigidity changing portions can be formed into a simple structure in which the wall surface of the rib groove is protruded.

An invention of claim 3 a third aspect is the pneumatic tire according to either one of the first or second aspects, characterized in that the discontinuous portions are lug grooves which are formed at an appropriate interval in the circumferential direction of the rib lines and extended in the tire width direction.

In this case, the lug grooves are groove portions in the tire width direction, which are formed on the rib lines. The lug grooves are provided on a general tread of the pneumatic tire, and at a moment when spaces in the lug grooves contact the road surface, the lug grooves become portions where the rigidity is lowered. The variations of the tire axle force, which are caused by the lug grooves, can be restricted by the rigidity changing portions.

An invention of a fourth aspect is the pneumatic tire according to any one of the first to third aspects, characterized in that the rigidity changing portions are provided at positions opposite to the discontinuous portions in the tire width direction.

In this case, though the tire is being continuously grounded substantially in the tire width direction as the tire rotates, the rigidity changing portions are opposed to the discontinuous portions in the tire width direction, and thus the rigidity changing portions and the discontinuous portions are grounded substantially simultaneously, and the variations of the tire axle force, which are caused by the discontinuous portions, can be stably canceled.

An invention of a fifth aspect is the pneumatic tire according to any one of the first to fourth aspects, characterized in that the discontinuous portions and the rigidity changing portions are simultaneously present on the footprint line of the tire.

In this case, the discontinuous portions and the rigidity changing portions are simultaneously present on the footprint line of the tire, and accordingly, at the same timing (moment) when the portions discontinuous in terms of the rigidity contact the road surface, the portions where the rigidity changing portions are formed are also grounded, and the tire axle force varying in the portions discontinuous in terms of the rigidity can be canceled with high precision.

An invention of a sixth aspect is the pneumatic tire according to any one of the first to fifth aspects, characterized in that the rigidity changing portions are provided to correspond to every predetermined number of the discontinuous portions. Also in this case where the rigidity changing portions are made to correspond to every predetermined number of the discontinuous portions, the total number of rigidity changing portions to be formed can be reduced without significantly lowering an effect of reducing the variations of the tire axle force in the tire as a whole.

BRIEF DESCRIPTION OF THE DRAWINGS

FIG. 6A shows a dimension example of a general portion; and FIG. 6B shows a dimension example of a portion where the protruding portion is formed.

FIG. 7 is a graph showing compared characteristics of tire axle forces in the basic constitution of the present invention.

BEST MODE FOR CARRYING OUT THE INVENTION

Embodiments of the present invention will be described below in detail with reference to the accompanying drawings.

(Basic Constitution)

In disclosing the embodiments, a basic constitution of a pneumatic tire 10 of the present invention will be first described with reference to FIGS. 1 to 7.

Figure 1:
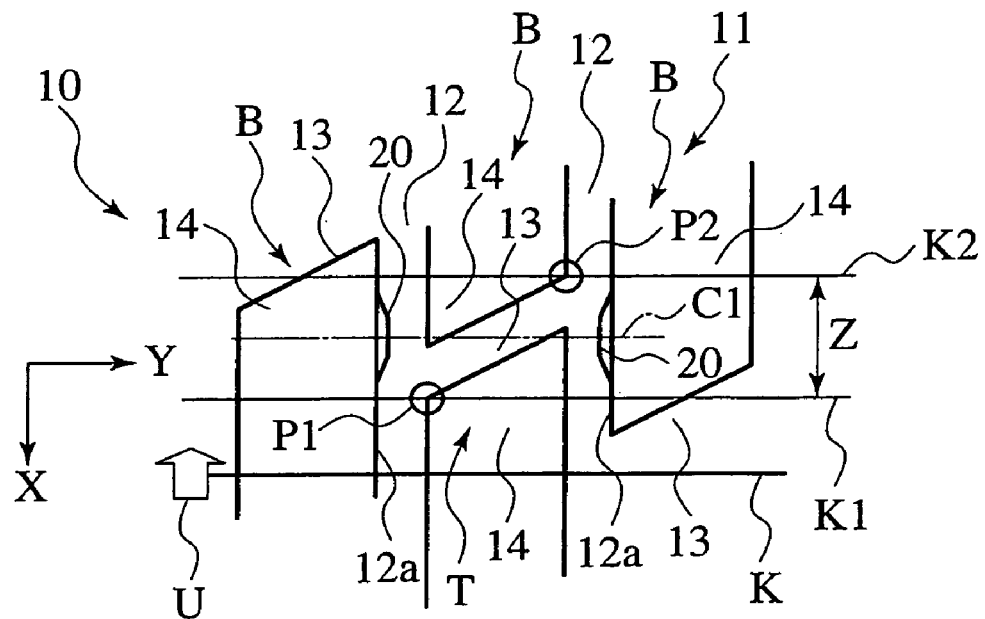
FIG. 1 is an enlarged view showing principal portions of a tread portion in a basic constitution of the present invention.
Figure 2:
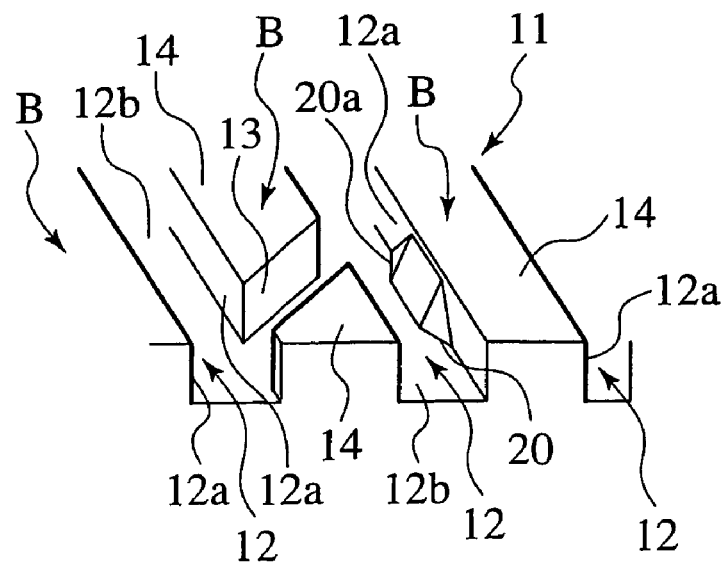
FIG. 2 is a principal portion perspective view of the tread portion in the basic constitution of the present invention.
Figure 3:
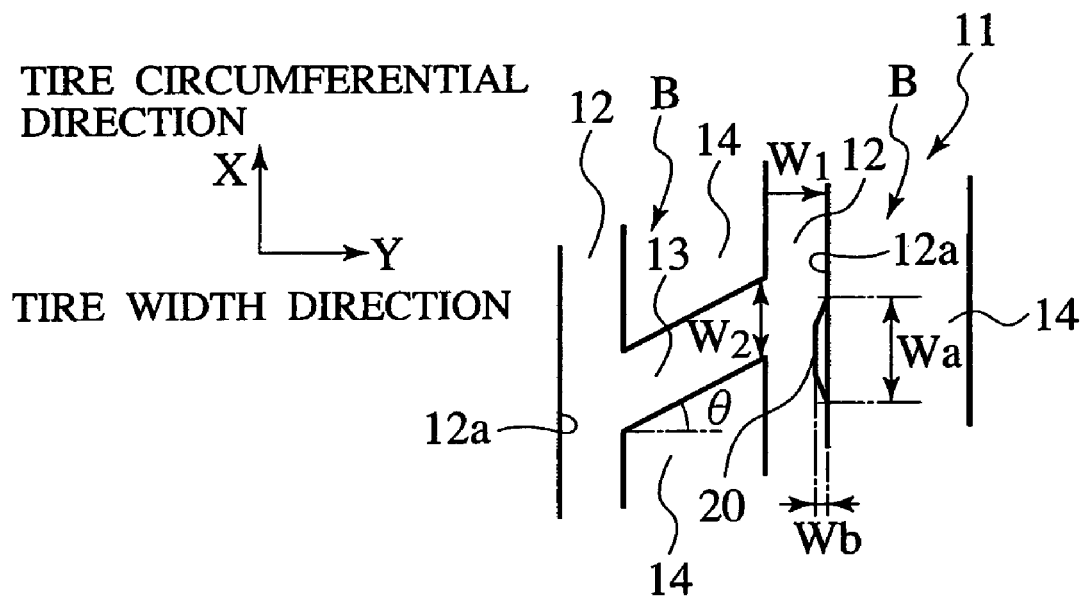
FIG. 3 is a principal portion enlarged view showing a planar shape of a protruding portion formed on a rib groove in the basic constitution of the present invention.
Figure 4:
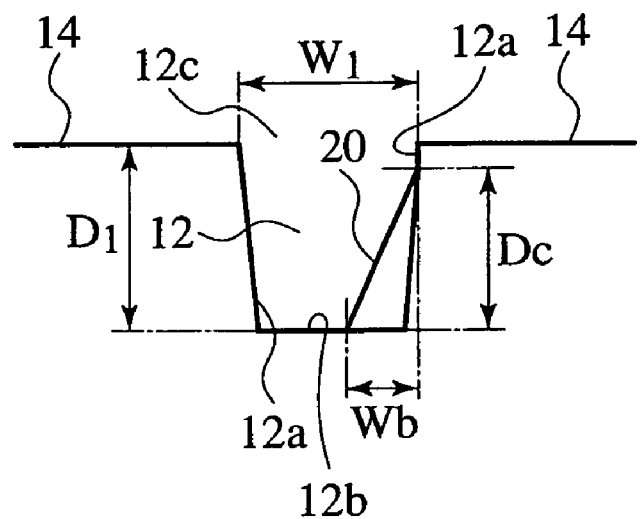
FIG. 4 is a principal portion enlarged view showing a cross-sectional shape of the protruding portion in the basic constitution of the present invention.
Figure 5:
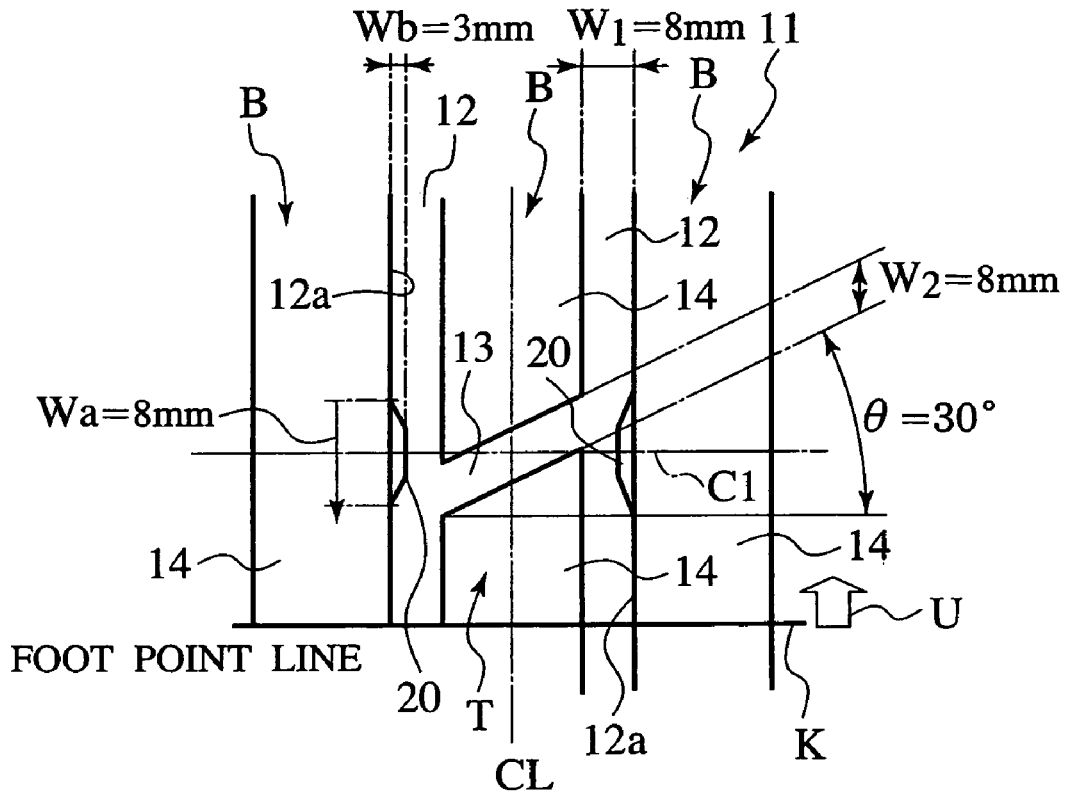
FIG. 5 is a principal portion enlarged view showing a dimension example of a planar shape of the tread portion in the basic constitution of the present invention.
Figure 6A:
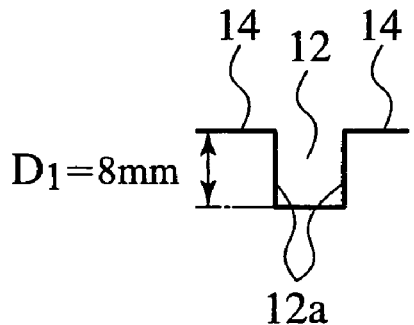
FIGS. 6A and 6B are principal portion enlarged views, each showing a dimension example of the rib groove in the basic constitution of the present invention.
Figure 6B:
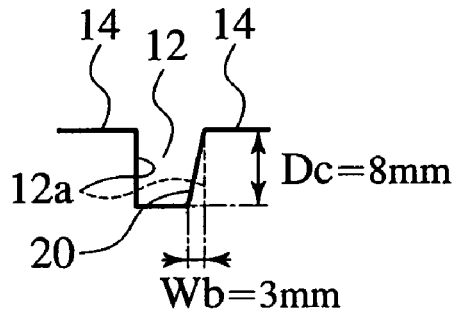

FIG. 1 is an enlarged view showing principal portions of a tread portion 11; FIG. 2 is a principal portion perspective view of the tread portion 11; FIG. 3 is a principal portion enlarged view showing a basic planar shape of a protruding portion 20 formed on a rib groove 12; FIG. 4 is a principal portion enlarged view showing a basic cross-sectional shape of the protruding portion 20; FIG. 5 is a principal portion enlarged view showing a dimension example of a planar shape of the tread portion 11; FIGS. 6A and 6B are principal portion enlarged views, each showing a dimension example of the rib groove 12: FIG. 6A shows a dimension example of a general portion; and FIG. 6B shows a dimension example of a portion where the protruding portion 20 is formed; and FIG. 7 is a graph showing compared characteristics of tire axle forces.

Specifically, in the tread portion 11 of the pneumatic tire 10 of the present invention, as shown in FIG. 1, on a tread surface portion T of the tread portion 11, at least one (usually, a plurality of) rib groove (a circumferential-direction groove) 12 extended in a tire circumferential direction X is formed, and rib lines B are formed by these rib grooves 12. In addition, in a circumferential direction of these rib lines B, a large number of lug grooves (lateral grooves) 13 becoming portions discontinuous in terms of rigidity in the tire circumferential direction X are formed at an appropriate interval across these rib lines B in a tire width direction Y.

Then, a large number of blocks (land portions) 14 are formed by the rib grooves 12 and the lug grooves 13, and surfaces of these blocks 14 become footprints on an unillustrated road surface. Note that, in this basic example, the lug grooves 13 are formed so as to be somewhat inclined with respect to the tire circumferential direction X. Moreover, the lug grooves 13 formed in the adjacent rib lines B and B are formed to be shifted from each other in the circumferential direction X so that the lug grooves 13 cannot overlap each other in the tire width direction Y.

In the pneumatic tire 10, a footprint line K is formed on a boundary of the tread surface portion T with the road surface. It is defined that this footprint line K moves upward in the drawing as indicated by an arrow U as the tire rotates during running. This footprint line K is extended in the vehicle width direction Y on a center portion of the pneumatic tire 10 in the tire width direction Y.

Here, in the present invention, as shown in FIG. 2, protruding portions 20 as rigidity changing portions canceling variations of the tire axle force occurring in the lug groove 13 are formed on wall surfaces 12a of the rib grooves 12. Specifically, a space portion is formed between each lug groove 13 and the road surface, and as described as the conventional problem, this lug groove 13 becomes a portion where the rigidity is lowered, and greatly lowers the tire axle force.

In this case, each protruding portion 20 is formed on the wall surface 12a on a side opposite to the rib line B forming the rib groove 12, that is, on the wall surface 12a on a side apart from the rib line B. Moreover, in FIG. 1, the protruding portions 20 are formed on the wall surfaces 12a of the rib grooves 12 on both sides of the lug groove 13; however, each protruding portion 20 may be formed only on either one of the rib grooves 12.

Moreover, as shown in FIG. 1, it is satisfactory if a center C1 of the protruding portion 20 is present within a range Z between a first line-position K1 in which the footprint line K passes through a contact start point P1 where the footprint line K first contacts the lug groove 13 and a second line position K2 in which the footprint line K passes through a contact end point P2 where the footprint line K finally leaves the lug groove 13.

FIGS. 3 and 4 show the shape and size of the protruding portion 20 with respect to the tread portion 11. As shown in FIG. 3, the protruding portion 20 is protruded from the wall surface 12a so that the planar shape thereof can become a substantially circular arc while providing a planar surface 20a on a tip thereof. In addition, as shown in FIG. 4, the protruding portion 20 is protruded so that a cross section thereof can become a substantially triangular shape in a manner that a protruding amount is gradually reduced from a bottom surface 12b of the rib groove 12 toward an opening portion 12c of the rib groove 12.

In this case, when a width of the rib groove 12 on a tire surface is defined as W1 and a width of the lug groove 13 is defined as W2 as shown in FIGS. 3 and 4, it is preferable to set a length Wa of the protruding portion 20 in the tire circumferential direction X as: $0.5W2 \leq Wa \leq 4W2$, and it is preferable to set the protruding amount Wb of the protruding portion 20 as: $0.05W1 \leq Wb \leq 0.5W1$. Furthermore, when a depth of the rib groove 12 is defined as D1, it is preferable to set a height Dc of the protruding portion 20 from the bottom surface 12b as: $0.3D1 \leq Dc \leq 1.0D1$.

FIGS. 5 and 6 show specific dimension examples of the tread portion 11 and the protruding portion 20. Each rib groove 12 is formed into a groove shape that is square in cross section in which both of the width W1 and the depth D1 are 8 mm. Moreover, the lug groove 13 is also formed into a groove shape that is square in cross section in which both of the width W2 and a depth (with no symbol added) are 8 mm. An inclination angle of this lug groove 13 is 30 degree. Furthermore, the protruding portion 20 is formed so that the length Wa can be 8 mm, the protruding amount Wb can be 3 mm, and the height Dc can be 8 mm. In FIG. 5, a reference symbol CL denotes an equatorial plane of the tire in the tire width direction Y.

(Operation)

In the pneumatic tire 10 constituted as described above, on the wall surfaces 12a of the rib grooves 12 formed on the tread surface portion T of the tread portion 11, the protruding portions 20 are formed so as to correspond to the lug grooves 13 formed at an appropriate interval in the circumferential direction of the rib lines B, and these protruding portions 20 are used as the rigidity changing portions. Accordingly, in the portions where the protruding portions 20 are formed, the rib lines B can increase rigidity against tread compression.

Hence, the variations of the tire axle force, which occur at the point of time when the lug grooves 13 reach the footprint line K as the tire rotates (in this case, the tire axle force is reduced because the lug grooves 13 become the portions where the rigidity is lowered), can be canceled by the protruding portions 20. Accordingly, the variations of the tire axle force, which are caused by the lug grooves 13, can be restricted by the protruding portions 20. Eventually, vibrational force to an axle is lowered, and the pattern noise caused thereby can be reduced effectively. Thus, a vehicle cabin is kept quiet while the vehicle is running, thus making it possible to enhance ride comfort.

Moreover, the protruding portions 20 are provided in the rib grooves 12, and thus the protruding portions 20 do not jut from the surface of the tire. Accordingly, even in the case where the protruding portions 20 are located within a region of the tread surface portion T, the surface of the tire 10 can be grounded smoothly. Therefore, another vibration cause can be prevented from occurring on the tire 10 by the protruding portions 20.

Furthermore, the protruding portions 20 are provided on the positions opposite to the lug grooves 13 in the tire width direction Y. Accordingly, when the tire 10 is being continuously grounded substantially in the tire width direction Y as the tire 10 rotates, the protruding portions 20 and the lug grooves 13 are grounded substantially simultaneously, and the variations of the tire axle force, which are caused by these lug grooves 13, are stably canceled by the rigidity changing portions as the protruding portions 20, thus making it possible to enhance the effect of lowering the pattern noise.

Furthermore, the lug grooves 13 and the protruding portions 20 are made to be simultaneously present on the footprint line K of the tire. Thus, at the same timing (moment) when the lug grooves 13 contact the road surface, the portions where the protruding portions 20 are formed are also grounded, and the tire axle force varying in the lug grooves 13 can be canceled with high precision, thus making it possible to significantly enhance the effect of restricting the pattern noise.

Moreover, in the pneumatic tire 10 of this embodiment, the protruding portions 20 which are formed on the wall surfaces 12a of the rib grooves 12 and increase the rigidity against the tread compression are used as the rigidity changing portions. Accordingly, a simple structure in which these protruding portions 20 are protruded from the wall surfaces 12a can be adopted, and therefore, the rigidity changing portions can be easily formed without greatly complicating a structure of a vulcanizing mold for the tire.

Next, the pneumatic tire 10 constituted to have a size of 195/65 R14, an internal pressure of 200 kPa and an applied load of 4 kN was tested with a tire axle force detection apparatus. Results of the test are shown in FIG. 7.

Specifically, in this test, (1) the case of only the lug grooves 16 in which the protruding portions 20 are not provided (indicated by a peak value F1), (2) the case of providing the protruding portions 20 only on one-side wall surfaces 12a of the rib grooves 12 (indicated by a peak value F2), and (3) the case of providing the protruding portions 20 on both of the opposite wall surfaces 12a of the rib grooves 12 (indicated by a peak value F3) were compared with one another. When these cases were compared by means of PP values, a result was obtained as: F1>F2>F3. As compared with (1) the case of only the lug grooves 16, in (3) the case of providing the protruding portions 20 on both of the wall surfaces 12a, an improvement effect of 40% was obtained.

(Embodiments)

Based on the basic constitution of the pneumatic tire 10 described above, specific pneumatic tires 10a to 10g will be disclosed by first to seventh embodiments shown in FIGS. 8 to 14.

(First embodiment)

Figure 8:
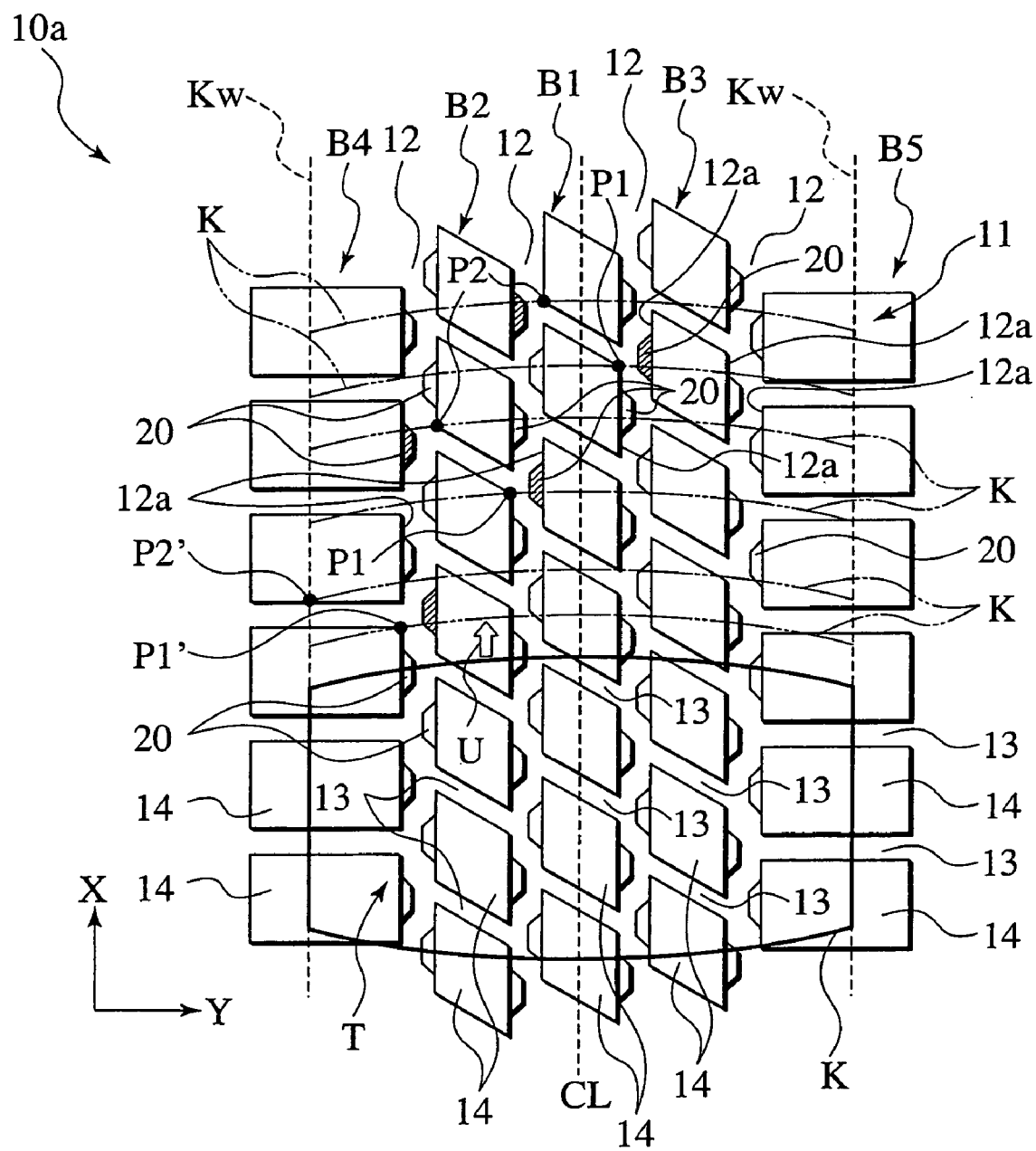
FIG. 8 is a bottom view showing a tread portion of a pneumatic tire of a first embodiment of the present invention.

FIG. 8 is a bottom view showing a tread portion 11 of the pneumatic tire 10a of the first embodiment of the present invention. The same reference numerals will be added to the same constituent portions as those of the basic structure, and duplicate description will be omitted. Then, the first embodiment will be described.

In the tread portion 11 of the pneumatic tire 10a of this first embodiment, three rib lines B1, B2 and B3 are provided on a center portion in the tire width direction Y, and wide rib lines B4 and B5 are provided on both shoulder portions (both-side portions in the width direction Y).

In this case, with regard to the three rib lines B1, B2 and B3 on the center portion, the rib line B1 is referred to as a center rib, and the rib lines B2 and B3 are referred to as second ribs. Moreover, the rib lines B4 and B5 on both shoulder portions are referred to as shoulder ribs. As a matter of course, the respective rib lines B1, B2, B3, B4 and B5 are formed by the plurality of rib grooves 12 extended in the tire circumferential direction X. Moreover, on each of the rib lines B1, B2, B3, B4 and B5, a large number of lug grooves 13 are formed, a large number of blocks 14 are formed by the rib grooves 12 and the lug grooves 13, and in this embodiment, sixty blocks 14 are arranged in the tire circumferential direction X.

Note that, in this embodiment, while the lug grooves 13 formed on the center rib B1 and the second ribs B2 and B3 are inclined in a fixed direction (at an inclination angle ω), the lug grooves 13 formed on the shoulder ribs B4 and B5 are formed parallel to the tire width direction Y.

An outer circumferential boundary of the tread surface portion T when the pneumatic tire 10 is grounded becomes the footprint line K, and this footprint line K continuously moves upward in the drawing as the tire rotates. Moreover, boundaries of the surface tread portion T in the tire width direction Y are located on the shoulder ribs B4 and B5, and footprint width lines Kw are set thereby.

Here, in this first embodiment, the protruding portions 20 are provided so as to correspond to the respective lug grooves 13 of the respective rib lines B1, B2, B3, B4 and B5, and the respective protruding portions 20 are formed on the wall surfaces 12a of the rib grooves 12, which are opposite to the respective lug grooves 13. Hence, in this embodiment, the protruding portions 20 are provided individually on both wall surfaces 12a of the respective rib grooves 12.

Moreover, the protruding portions 20 are provided so as to correspond to all of the lug grooves 13, and thus sixty protruding portions 20 corresponding to the number of blocks 14 are provided in the tire circumferential direction X of each wall surface 12a.

Incidentally, as shown in FIG. 1, the position where each protruding portion 20 is formed is set between the first line position K1 in which the footprint line K passes through the contact start point P1 with the lug groove 13 corresponding to the protruding portion 20 and the second line position K2 in which the footprint line K passes through the contact end point P2 with the lug groove 13. Meanwhile, in the shoulder ribs B4 and B5, each contact point P1' is set on a point of intersection of the lug groove 13 and a footprint width line Kw. Similar settings are made in the following respective embodiments. Note that each contact end point P2' of the shoulder ribs B4 and B5 is determined by a point of intersection of the lug groove 13 and the footprint line K as in the rib lines B1, B2 and B3 on the center portion.

(Second Embodiment)

Figure 9:
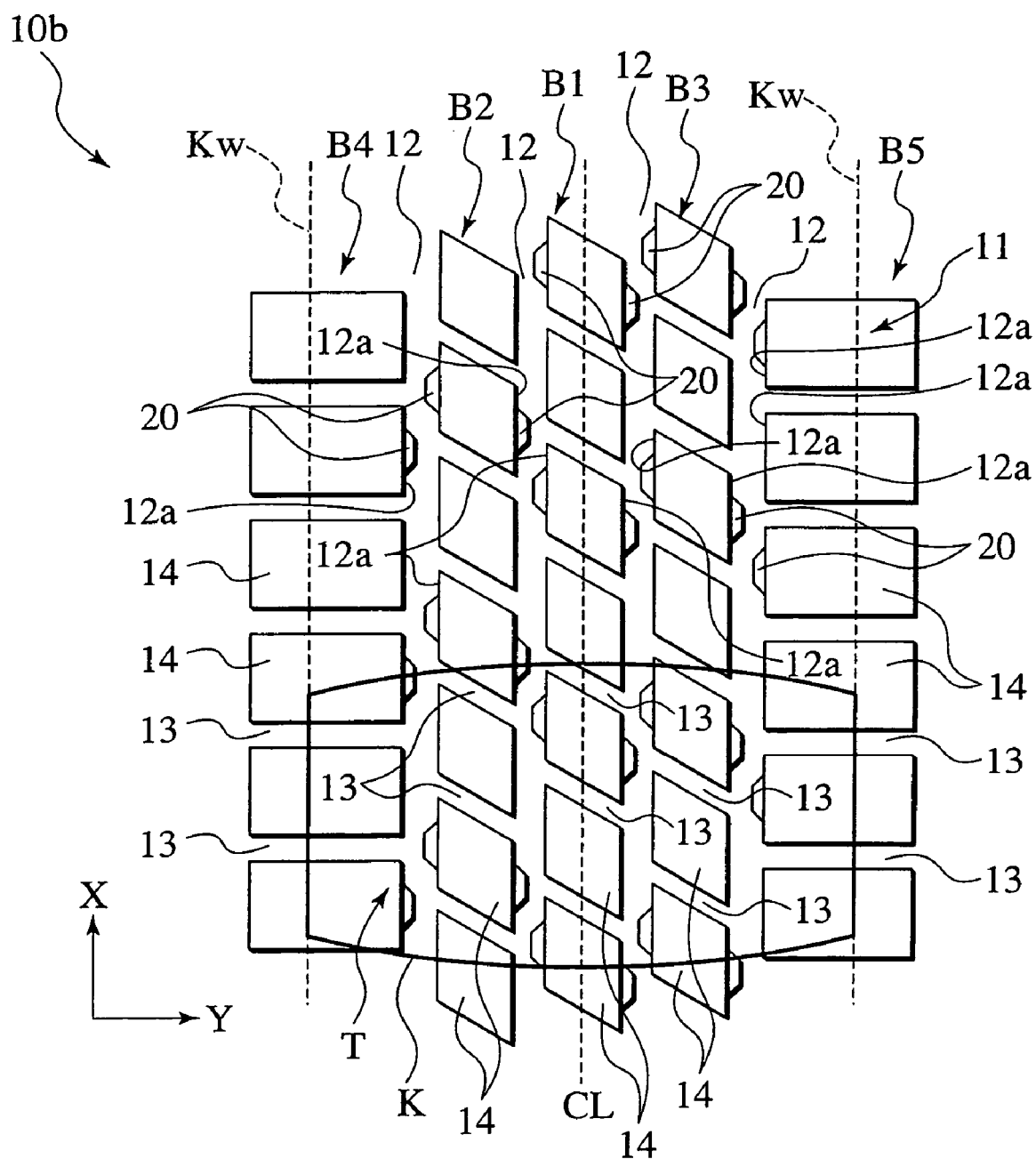
FIG. 9 is a bottom view showing a tread portion of a pneumatic tire of a second embodiment of the present invention.

FIG. 9 is a bottom view showing a tread portion 11 of the pneumatic tire 10b of the second embodiment of the present invention. The same reference numerals will be added to the same constituent portions as those of the first embodiment, and duplicate description will be omitted. Then, the second embodiment will be described.

On the tread portion 11 of the pneumatic tire 10b of this second embodiment, the same number of rib grooves 12 and lug grooves 13 in the same shape as those of the first embodiment are formed, and on each of the rib lines B1, B2, B3, B4 and B5, sixty blocks 14 are provided in the tire circumferential direction X.

Here, in this second embodiment, the protruding portions 20 are alternately provided for the respective lug grooves 13 of each of the rib lines B1, B2, B3, B4 and B5, and thirty protruding portions 20 which are a half of the blocks 14 in number are provided in the tire circumferential direction X of each wall surface 12a.

In this case, in the center rib B1 and the second ribs B2 and B3, the protruding portions 20 which are a half of the blocks 14 in number are alternately arranged on both sides of the blocks 14 formed on the respective ribs B1, B2 and B3.

Incidentally, in this second embodiment, the protruding portions 20 are provided so as to correspond to the alternate lug grooves 13 formed in the tire circumferential direction X. Also in the case where the protruding portions 20 are made to correspond to every predetermined number of the lug grooves 13 in such a way, and the total number of protruding portions 20 to be formed is reduced without significantly lowering the effect of reducing the variations of the tire axle force in the tire as a whole, thus making it possible to achieve a cost reduction of the tire. A similar achievement is also made in the third embodiment to be described below.

(Third Embodiment)

Figure 10:
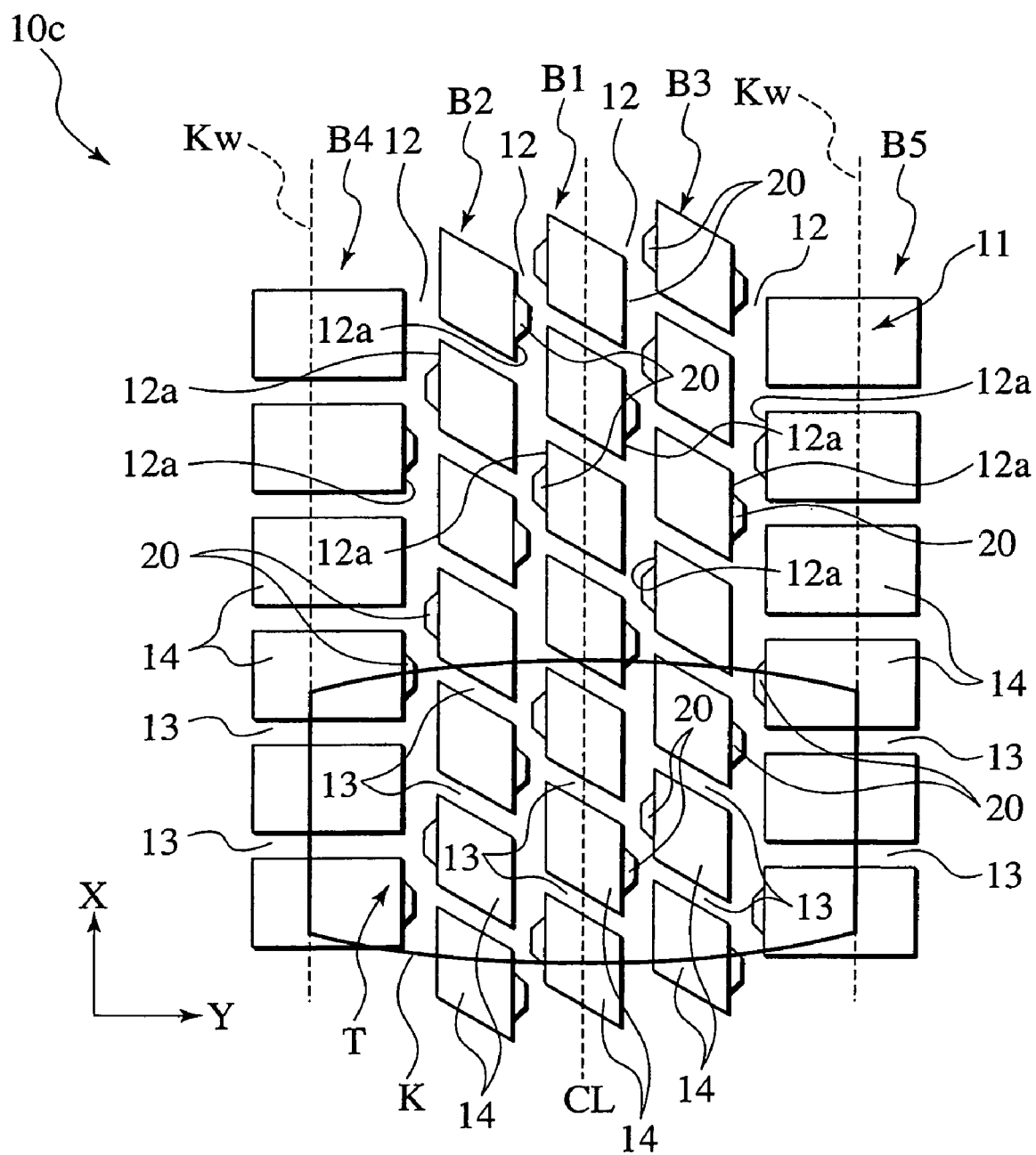
FIG. 10 is a bottom view showing a tread portion of a pneumatic tire of a third embodiment of the present invention.

FIG. 10 is a bottom view showing a tread portion 11 of the pneumatic tire 10c of the third embodiment of the present invention. The same reference numerals will be added to the same constituent portions as those of the first embodiment, and duplicate description will be omitted. Then, the third embodiment will be described.

Also on the tread portion 11 of the pneumatic tire 10c of this third embodiment, the same number of rib grooves 12 and lug grooves 13 in the same shape as those of the first embodiment are formed, and on each of the rib lines B1, B2, B3, B4 and B5, sixty blocks 14 are provided in the tire circumferential direction X.

Here, as in the second embodiment, the protruding portions 20 are alternately provided for the respective lug grooves 13 of each of the rib lines B1, B2, B3, B4 and B5 in this third embodiment. Hence, thirty protruding portions 20 which are a half of the blocks 14 in number are provided in the tire circumferential direction X of each wall surface 12a. Each of these protruding portions 20 is arranged only on one side of each block 14 formed on the respective ribs B1, B2 and B3.

(Fourth Embodiment)

Figure 11:
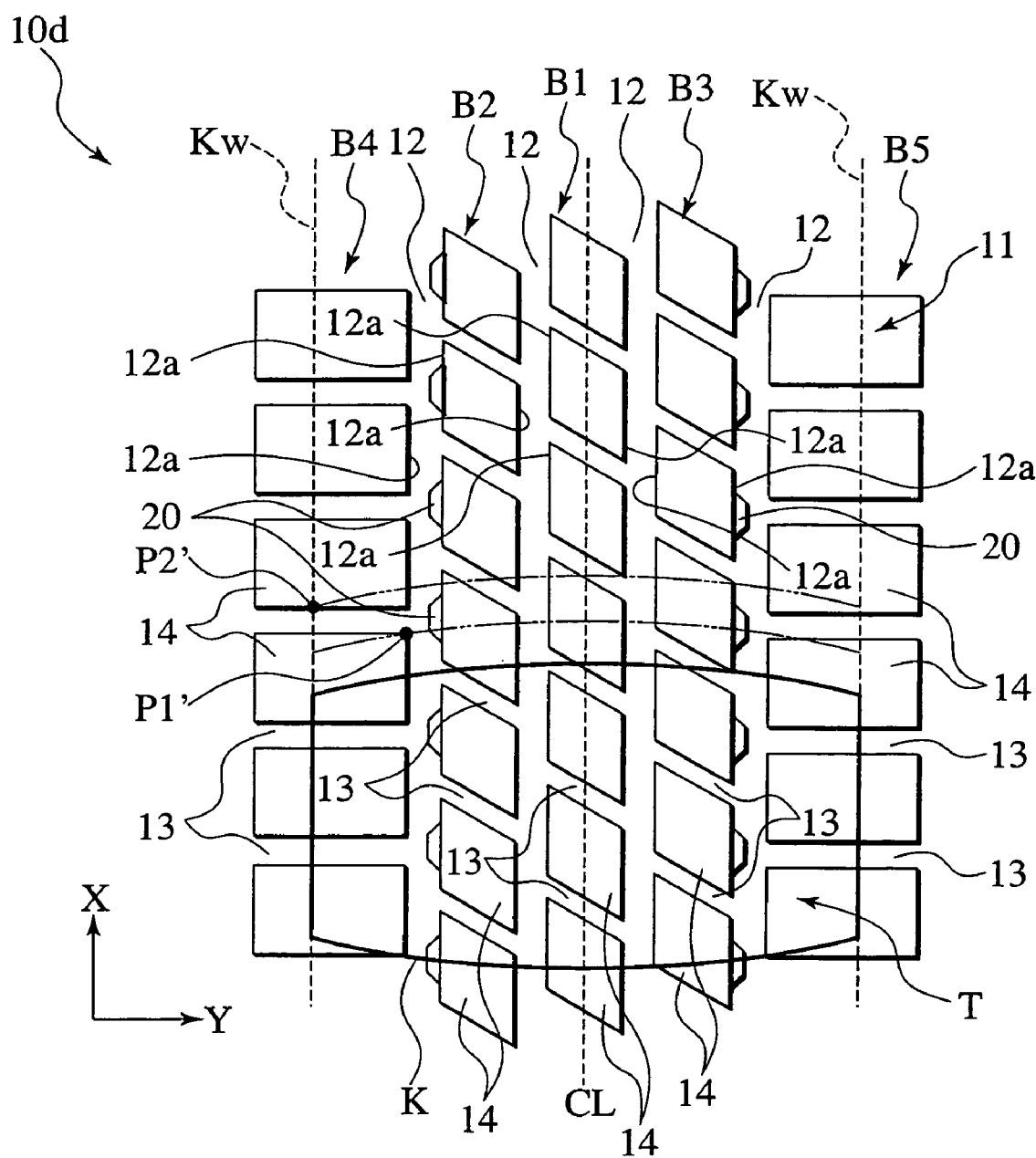
FIG. 11 is a bottom view showing a tread portion of a pneumatic tire of a fourth embodiment of the present invention.

FIG. 11 is a bottom view showing a tread portion 11 of the pneumatic tire 10d of the fourth embodiment of the present invention. The same reference numerals will be added to the same constituent portions as those of the first embodiment, and duplicate description will be omitted. Then, the fourth embodiment will be described.

Also on the tread portion 11 of the pneumatic tire 10d of this fourth embodiment, the same number of rib grooves 12 and lug grooves 13 in the same shape as those of the first embodiment are formed, and on each of the rib lines B1, B2, B3, B4 and B5, sixty blocks 14 are provided in the tire circumferential direction X.

Here, in this fourth embodiment, the protruding portions 20 are provided so as to correspond only to the lug grooves 13 formed on the shoulder ribs B4 and B5. Hence, the protruding portions 20 are formed on the wall surfaces 12a of the rib grooves 12 between the second rib B2 and the shoulder rib B4 and between the second rib B3 and the shoulder rib B5, the wall surfaces 12a belonging to the second ribs B2 and B3.

Moreover, in this fourth embodiment, the protruding portions 20 are provided so as to correspond to all of the lug grooves 13 of the shoulder ribs B4 and B5, and accordingly, sixty protruding portions 20 are provided in the tire circumferential direction X.

(Fifth Embodiment)

Figure 12:
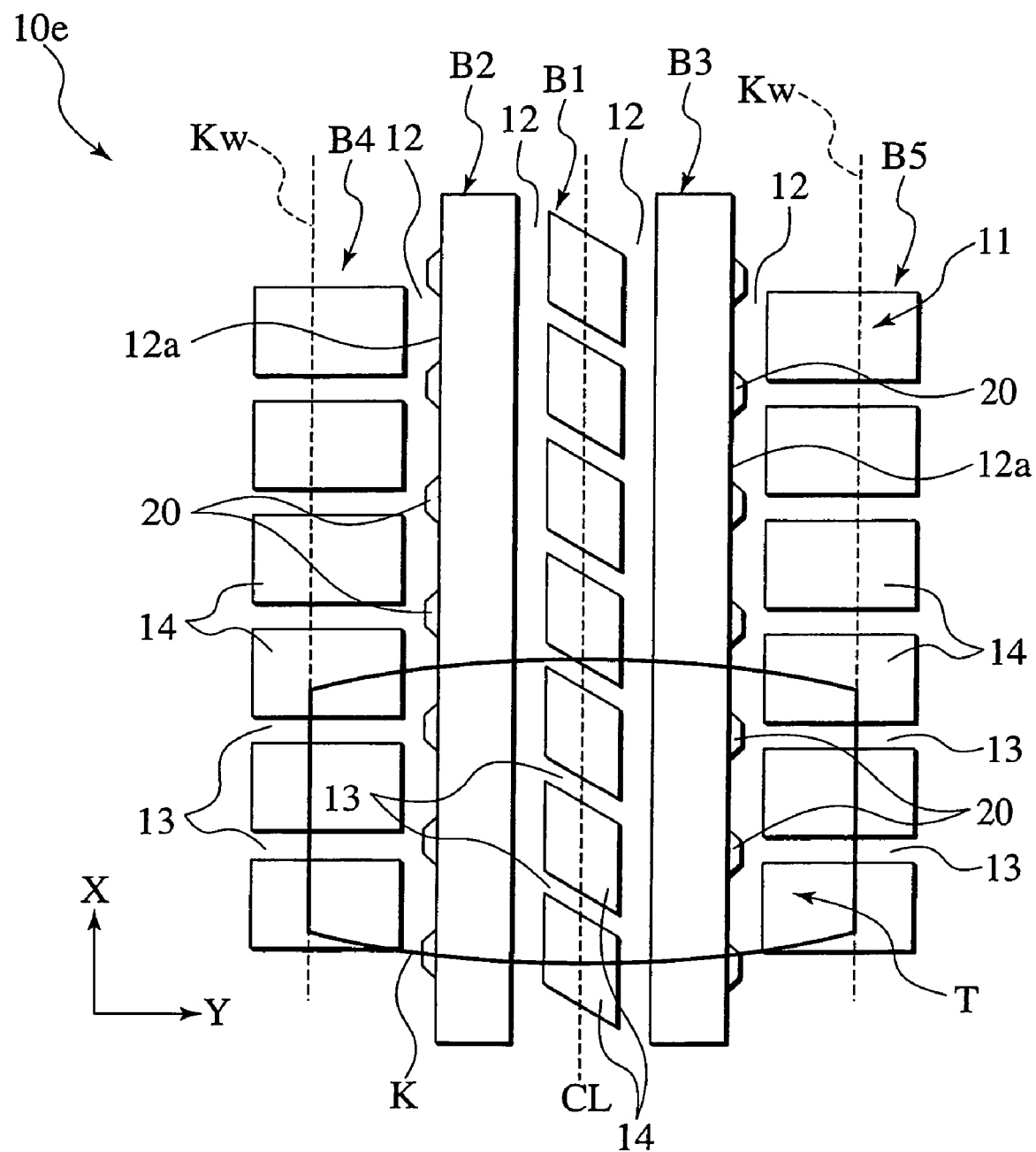
FIG. 12 is a bottom view showing a tread portion of a pneumatic tire of a fifth embodiment of the present invention.

FIG. 12 is a bottom view showing a tread portion 11 of the pneumatic tire 10e of the fifth embodiment of the present invention. The same reference numerals will be added to the same constituent portions as those of the first embodiment, and duplicate description will be omitted. Then, the fifth embodiment will be described.

Also on the tread portion 11 of the pneumatic tire 10e of this fifth embodiment, the same number of rib grooves 12 and lug grooves 13 in the same shape as those of the first embodiment are formed, and on each of the rib lines B1, B4 and B5, sixty blocks 14 are provided in the tire circumferential direction X.

Here, in the pneumatic tire 10e of this fifth embodiment, the lug grooves 13 are not formed on the second ribs B2 and B3 provided on the pneumatic tire 10d of the fourth embodiment, but the second ribs B2 and B3 are formed into a belt shape that is continuous.

(Sixth Embodiment)

Figure 13:
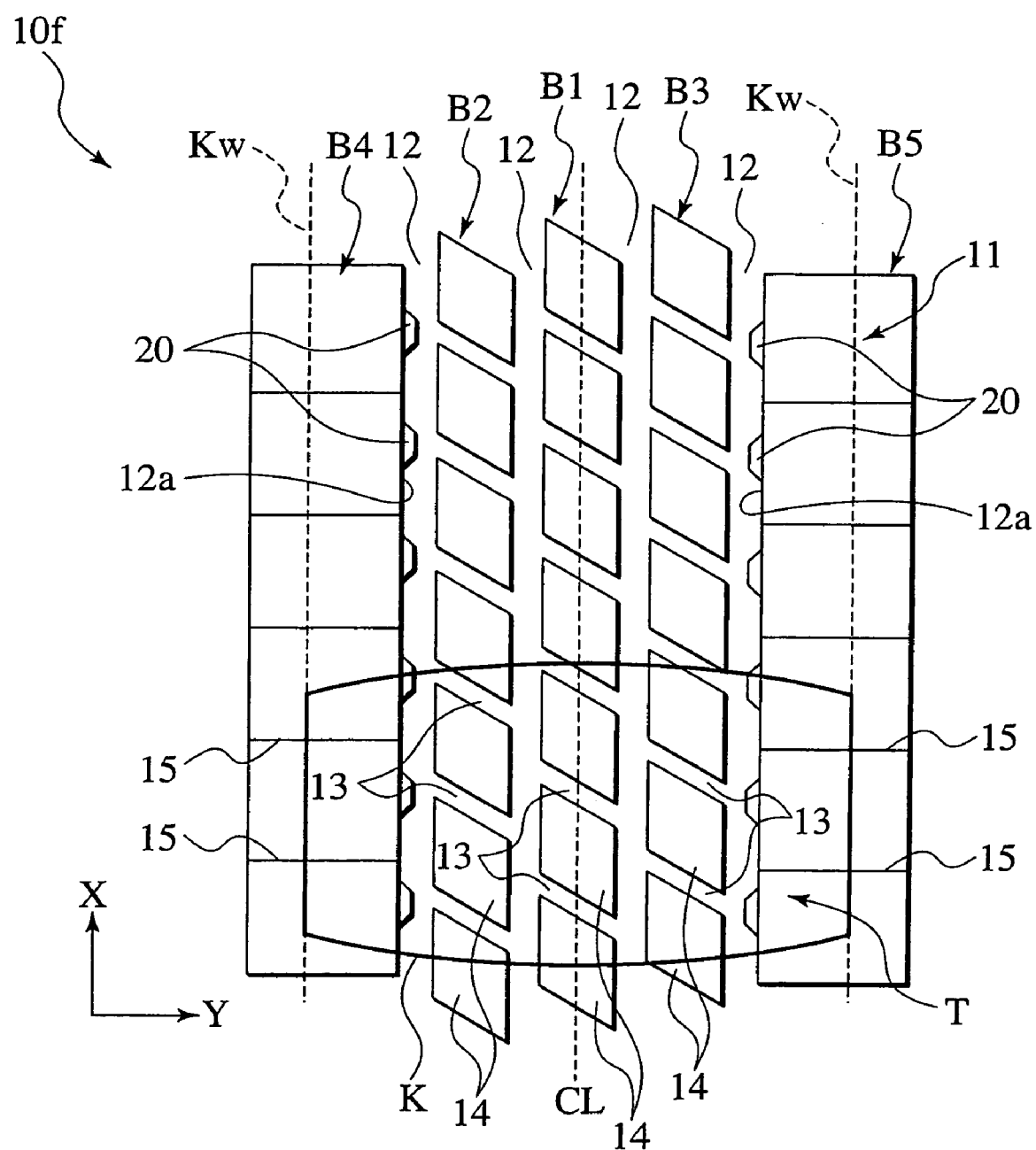
FIG. 13 is a bottom view showing a tread portion of a pneumatic tire of a sixth embodiment of the present invention.

FIG. 13 is a bottom view showing a tread portion 11 of the pneumatic tire 10f of the sixth embodiment of the present invention. The same reference numerals will be added to the same constituent portions as those of the first embodiment, and duplicate description will be omitted. Then, the sixth embodiment will be described.

On the tread portion 11 of the pneumatic tire 10f of this sixth embodiment, the center rib B1, the second ribs B2 and B3 and the shoulder ribs B4 and B5 are provided as in the first embodiment. Particularly, in this sixth embodiment, the lug grooves 13 are formed only on the center rib B1 and the second ribs B2 and B3, and on the shoulder ribs B4 and B5, the lug grooves 13 are not formed. Note that, on the shoulder ribs B4 and B5, sipes 15 are formed instead of the lug grooves 13.

Then, in this sixth embodiment, the protruding portions 20 are provided so as to correspond only to the lug grooves 13 formed on the second ribs B2 and B3. Hence, the protruding portions 20 are formed on the wall surfaces 12a of the rib grooves 12 between the second rib B2 and the shoulder rib B4 and between the second rib B3 and the shoulder rib B5, the wall surfaces 12a belonging to the shoulder ribs B4 and B5.

Moreover, in this sixth embodiment, the protruding portions 20 are provided so as to correspond to all of the lug grooves 13 of the second ribs B2 and B3, and accordingly, sixty protruding portions 20 are provided in the tire circumferential direction X.

(Seventh Embodiment)

Figure 14:
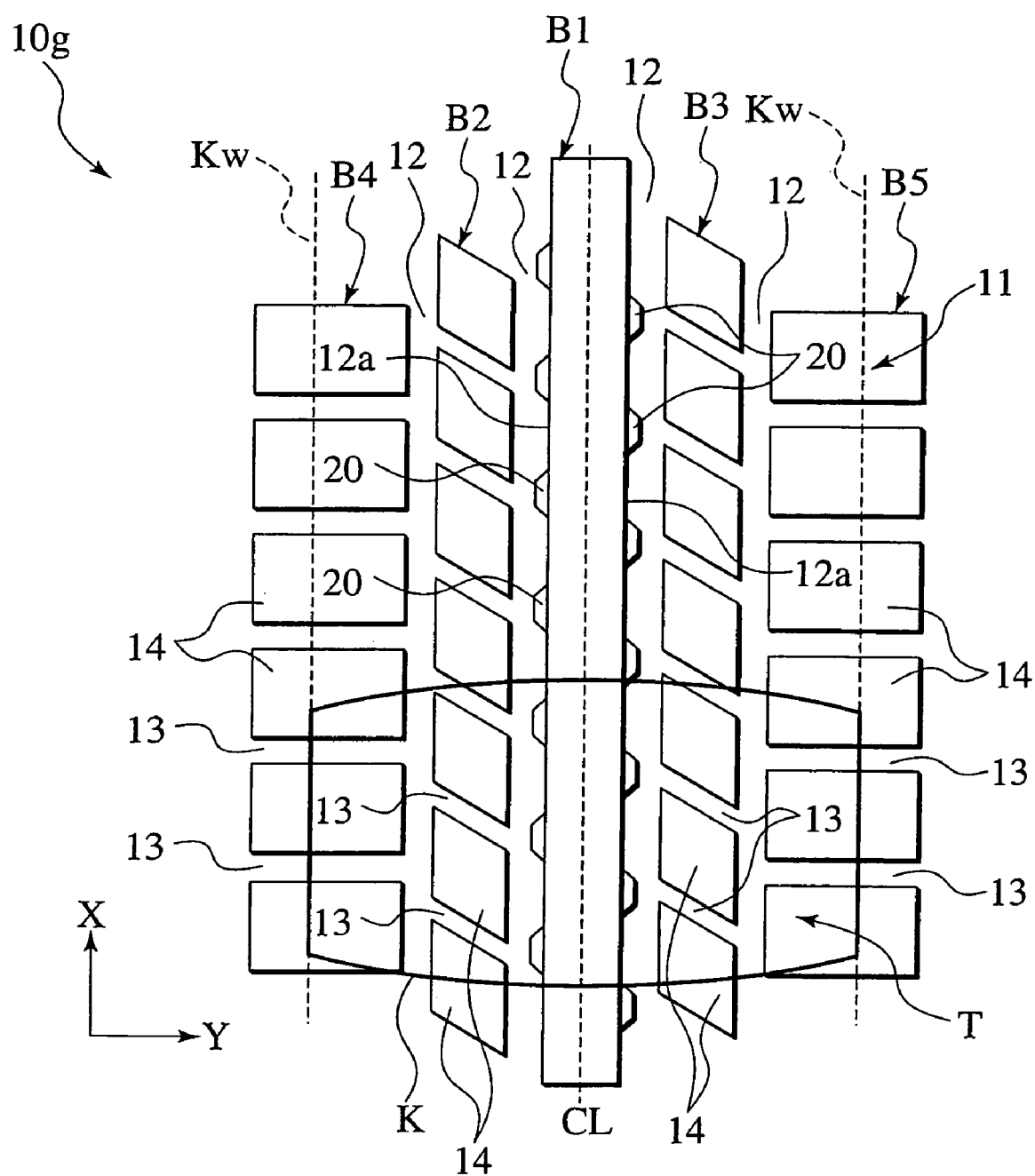
FIG. 14 is a bottom view showing a tread portion of a pneumatic tire of a seventh embodiment of the present invention.

FIG. 14 is a bottom view showing a tread portion 11 of the pneumatic tire 10g of the seventh embodiment of the present invention. The same reference numerals will be added to the same constituent portions as those of the first embodiment, and duplicate description will be omitted. Then, the seventh embodiment will be described.

On the tread portion 11 of the pneumatic tire 10g of this seventh embodiment, the center rib B1, the second ribs B2 and B3 and the shoulder ribs B4 and B5 are provided as in the first embodiment. Particularly, in this seventh embodiment, the lug grooves 13 are formed on the second ribs B2 and B3 and the shoulder ribs B4 and B5, and on the center rib B1, the lug grooves 13 are not formed, but the center rib B1 is formed into a belt shape that is continuous.

Then, also in this seventh embodiment, the protruding portions 20 are formed so as to correspond only to the lug grooves 13 formed on the second ribs B2 and B3 as in the sixth embodiment. However, in this seventh embodiment, the protruding portions 20 are formed on the wall surfaces 12a of the rib grooves 12 between the center rib B1 and the second rib B2 and between the center rib B1 and the second rib B3, the wall surfaces 12a belonging to the center rib B1.

Moreover, also in this seventh embodiment, the protruding portions 20 are provided so as to correspond to all of the lug grooves 13 of the second ribs B2 and B3, and accordingly, sixty protruding portions 20 are provided in the tire circumferential direction X.

(Dimensions of Tread Portions and Protruding Portions of Respective Embodiments)

Incidentally, the specific dimensions of the tread portions 11 and protruding portions 20 of the respective pneumatic tires 10a to 10g shown in the first to seventh embodiments (refer to FIGS. 3 and 4) are common to the respective embodiments. In each of the rib grooves 12, both of the width W1 and the depth D1 are 8 mm, and in each of the lug grooves 13, both of the width W2 and the depth (with no symbol added) are 8 mm. Moreover, in each of the protruding portions 20, the circumferential-direction length Wa is 10 mm, the protruding amount Wb is 3 mm, and the height Dc is 8 mm. Note that a rib width of each of the rib lines B1, B2 and B3 on the center portion is 24 mm.

Next, the pneumatic tires 10a to 10g of the first to seventh embodiments (each of which was constituted to have a size of 195/65 R14 and an internal pressure of 200 kPa) were individually used in a passenger car with an engine capacity of 2000 cc, and the noise in the vehicle cabin (a band value of frequencies from 400 to 600 Hz containing a primary frequency of a pattern pitch) in comparison with a conventional tire was measured for each of the pneumatic tires. Results of the measurements are shown in the following table. In this case, the noise in the vehicle cabin was measured with a sound at driver's ears taken as a reference, and sensory evaluations of the driver were also described together with the measurement results. Note that, with regard to running conditions of the passenger car, two persons rode in the car, and the car ran on a smooth concrete road at a vehicle speed of 50 Km/h.

TABLE

| | Noise in Vehicle Cabin in Comparison with Conventional Tire (Band Value of Frequencies from 400 to 500 Hz Containing Primary Frequency of Pattern Pitch) | Sensory Evaluation of Driver |
|---|---|---|
| First Embodiment | −3.5 dB | Excellent (Improved) |
| Second Embodiment | −3 dB | Excellent (Improved) |
| Third Embodiment | −3 dB | Excellent (Improved) |
| Fourth Embodiment | −2.5 dB | Excellent (Improved) |
| Fifth Embodiment | −2.5 dB | Excellent (Improved) |
| Sixth Embodiment | −2 dB | Good (Improved) |
| Seventh Embodiment | −2 dB | Good (Improved) |

Hence, from the above table, it is recognized that the noise in the vehicle cabin was improved (reduced) by 3.5 dB in the first embodiment, by 3 dB in the second and third embodiments, by 2.5 dB in the fourth and fifth embodiments, and by 2 dB in the sixth and seventh embodiments, and that improvements were achieved in all of the embodiments with regard to the sensory evaluations of the driver.

Incidentally, the protruding portions 20 in the respective embodiments may be formed into any shape as long as the protruding portions 20 can increase the rigidity against the tread compression.

Moreover, in this embodiment, the lug grooves 13 which reduce the tire axle force as the portions discontinuous in terms of the rigidity are perceived as problems, and accordingly, the case where the protruding portions 20 which increase the rigidity as the rigidity changing portions are provided is disclosed. However, the present invention is not limited to this, and in the case where the discontinuous portions are stud pins and the like and increase the rigidity, concave portions which lower the tire rigidity can be provided as the rigidity changing portions.

Moreover, the rigidity changing portions are not limited to convex and concave portions such as the protruding portions and the concave portions, and a material of the portions concerned is partially changed, thus making it possible to change the rigidity.

Furthermore, the pneumatic tire of the present invention is not limited to the respective embodiments, and can adopt various embodiments without departing from the gist of the present invention.

INDUSTRIAL APPLICABILITY

In accordance with the invention according to the first aspect, the rigidity changing portions, which cancel the variations of the tire axle force caused by the discontinuous portions, are provided in the rib groove. Accordingly, the variations of the tire axle force caused by the discontinuous portions can be restricted by the rigidity changing portions, and eventually, the vibrational force to the axle is lowered, and the pattern noise caused thereby can be reduced effectively. Therefore, the vehicle cabin is kept quiet, thus making it possible to enhance the ride comfort. Moreover, the rigidity changing portions which cancel the variations of the tire axle force due to the discontinuous portions are provided in the rib groove, and thus the tire surface can be grounded smoothly. Therefore, another vibration cause can be prevented from occurring by the rigidity changing portions.

In accordance with the invention according to the second aspect, in addition to the effect of the invention of the first aspect, the protruding portions which are formed on the wall surface of the rib groove and increase the rigidity against the tread compression are used as the rigidity changing portions. Accordingly, the rigidity changing portions can be formed into the simple structure in which the wall surface of the rib groove is protruded. Therefore, the rigidity changing portions can be easily formed without greatly complicating the structure of the vulcanizing mold for the tire.

In accordance with the invention according to the third aspect, in addition to the effects of the inventions of the first and second aspects, the discontinuous portions are the lug grooves which are formed at an appropriate interval in the circumferential direction of the rib lines and extended in the tire width direction. Accordingly, the variations of the tire axle force, which are caused by the lug grooves, can be restricted by the rigidity changing portions. Therefore, the pattern noise of a general pneumatic tire can be reduced efficiently.

In accordance with the invention according to the fourth aspect, in addition to the effects of the inventions of the first to third aspects, the rigidity changing portions are provided at the positions opposite to the discontinuous portions in the tire width direction. Accordingly, the rigidity changing portions and the discontinuous portions can be grounded substantially simultaneously. Therefore, the variations of the tire axle force, which are caused by the discontinuous portions, are stably canceled, thus making it possible to enhance the effect of reducing the pattern noise.

In accordance with the invention according to the fifth aspect, in addition to the effects of the inventions of the first to fourth aspects, the discontinuous portions and the rigidity changing portions are made to be simultaneously present on the footprint line of the tire. Accordingly, at the same timing (moment) when the portions discontinuous in terms of the rigidity contact the road surface, the portions where the rigidity changing portions are formed can also be grounded. Therefore, the tire axle force varying in the portions discontinuous in terms of the rigidity can be canceled with high precision, and the effect of restricting the pattern noise can be significantly enhanced.

In accordance with the invention according to the sixth aspect, in addition to the effects of the inventions of the first to fifth aspects, the rigidity changing portions are provided to correspond to every predetermined number of the discontinuous portions. Accordingly, the total number of rigidity changing portions to be formed is reduced without significantly lowering the effect of reducing the variations of the tire axle force in the tire as a whole, thus making it possible to achieve a cost reduction of the tire.

The invention claimed is:

1. A pneumatic tire, comprising:

a tread portion in which at least one rib groove extended in a tire circumferential direction is formed on a tread surface portion, and portions discontinuous in terms of rigidity are formed in a circumferential direction of rib lines formed by the rib groove, the discontinuous portions causing variations of tire axle force, wherein rigidity changing portions which cancel the variations of the tire axle force, caused by the discontinuous portions, are provided in the rib groove, wherein the rigidity changing portions include protruding portions which are formed on a wall surface of the rib groove and increase rigidity against tread compression, and wherein each protruding portion is protruded from the wall surface so that a planar shape of the protruding portion forms a substantially circular arc with a planar surface on a tip and a cross-section of the protruding portion forms a substantially triangular shape in a manner that a protruding amount is gradually reduced from a bottom surface of the rib groove toward an opening portion of the rib groove.

2. The pneumatic tire according to claim 1, wherein the discontinuous portions are lug grooves which are formed at an appropriate interval in the circumferential direction of the rib lines and extended in a tire width direction.

3. The pneumatic tire according to claim 2, wherein the rigidity changing portions are provided at positions opposite to the discontinuous portions in the tire width direction.

4. The pneumatic tire according to claim 2, wherein the discontinuous portions and the rigidity changing portions are simultaneously present on a footprint line of the tire.

5. The pneumatic tire according to claim 2, wherein the rigidity changing portions are provided to correspond to every predetermined number of the discontinuous portions.

6. The pneumatic tire according to claim 1, wherein the rigidity changing portions are provided at positions opposite to the discontinuous portions in the tire width direction.

7. The pneumatic tire according to claim 6, wherein the discontinuous portions and the rigidity changing portions are simultaneously present on a footprint line of the tire.

8. The pneumatic tire according to claim 6, wherein the rigidity changing portions are provided to correspond to every predetermined number of the discontinuous portions.

9. The pneumatic tire according to claim 1, wherein the discontinuous portions and the rigidity changing portions are simultaneously present on a footprint line of the tire.

10. The pneumatic tire according to claim 9, wherein the rigidity changing portions are provided to correspond to every predetermined number of the discontinuous portions.

11. The pneumatic tire according to claim 1, every predetermined number of the discontinuous portions.

* * * * *